United States Patent [19]
Titterington et al.

[11] Patent Number: 6,039,794
[45] Date of Patent: Mar. 21, 2000

[54] ANTHRAQUINONE COLORANTS FOR PHASE CHANGE INKS

[75] Inventors: Donald R. Titterington, Tualatin; Jeffery H. Banning, Hillsboro, both of Oreg.

[73] Assignee: Tektronix, Inc., Wilsonville, Oreg.

[21] Appl. No.: 09/235,899

[22] Filed: Jan. 22, 1999

[51] Int. Cl.⁷ .................................................. C09D 11/00
[52] U.S. Cl. ................................ 106/31.29; 106/31.44; 106/31.43
[58] Field of Search ............................ 106/31.29, 31.61, 106/31.44, 31.43, 31.75

[56] References Cited

U.S. PATENT DOCUMENTS

| | | |
|---|---|---|
| 2,050,662 | 8/1936 | Keoberle et al. . |
| 3,247,229 | 4/1966 | Singer et al. . |
| 4,812,354 | 3/1989 | Sugiyama et al. ...................... 428/195 |
| 5,817,843 | 10/1998 | Masuda et al. ....................... 106/31.27 |

FOREIGN PATENT DOCUMENTS

| | | |
|---|---|---|
| 2694564 | 8/1992 | France . |
| 2209984 | 9/1973 | Germany . |
| 1094925 | 12/1967 | United Kingdom . |

OTHER PUBLICATIONS

European Patent Application, 0 415 859 A1, Filing Date: Aug. 31, 1990.
European Patent Applicatiom EP 0 775 729 A1, Filing Date: Oct. 8, 1996.

*Primary Examiner*—Mark L. Bell
*Assistant Examiner*—Veronica F. Faison
*Attorney, Agent, or Firm*—Oliff & Berridge, PLC

[57] ABSTRACT

Phase change inks containing at least one colorant that comprises the reaction product of at least one oxy-substituted-9,10-anthraquinone compound with at least one monofunctional amine.

7 Claims, No Drawings

ANTHRAQUINONE COLORANTS FOR PHASE CHANGE INKS

BACKGROUND OF THE INVENTION

1. Field of the Invention

The present invention relates to the use of selected anthraquinone colorants in phase change inks. In particular, the invention relates to phase change ink compositions that comprise the combination of at least one phase change ink carrier component and a compatible phase change ink colorant that comprises the reaction product of at least one oxy-substituted-9,10-anthraquinone compound with at least one monofunctional amine compound.

2. Brief Description of Art

Phase change inks in digital printing applications (also sometimes called solid inks or hot melt inks) have in the past decade gained significant consumer acceptance as an alternative to more traditional printing systems such as offset printing, flexography printing, gravure printing, letterpress printing and the like. Phase change inks are especially desirable for the peripheral printing devices associated with computer technology, as well as being suitable for use in other printing technologies such as gravure printing applications as referenced in U.S. Pat. No. 5,496,879 and German Patent Publications DE 4205636AL and DE4205713AL assigned to Siegwerk Farlenfabrik Keller, Dr. Rung & Co.

In general, phase change inks are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops.

They are easy to use and safe. They can be easily loaded into the printer by the user, generally in the form of solid sticks of yellow, magenta, cyan and black ink having a solid consistency similar to children's crayons. Inside the printer, these inks are melted at an elevated temperature in a print head having a number of orifices, through which the melted ink will be ejected onto the desired substrate such as media like paper or an overhead transparency film. Alternatively, the melted ink may be transferred to a rotating drum and then transferred to the substrate. As the ink cools on the substrate, it re-solidifies into the desired image. This resolidification process, or phase change, is instantaneous and a printed, dry image is thus made upon leaving the printer, which is available immediately to the user.

These phase change inks contain no solvents or diluents that can lead to undesired emissions. In all, the use and specific design of the phase change ink addresses many of the limitations of more traditional ink and printing processes.

Furthermore, because the ink is in a cool, solid form at any time when the user can actually come in contact with the ink, and the ink is in a molten state only inside the printer (inaccessible to the user), it is generally safe to use. These inks also have long-term stability for shipping and long storage times.

The phase change inks generally comprise a phase change ink carrier composition, which is combined with at least one compatible phase change ink colorant. The carrier composition has been generally composed of resins, fatty acid amides and resin derived materials. Also, plasticizers, waxes, antioxidants and the like have been added to the carrier composition. Generally the resins used must be water-insoluble and the carrier composition may contain no ingredients that are volatile at the jetting temperatures employed. Also, these carrier ingredients should be chemically stable so as not to lose their chemical identity over time and/or under elevated temperature conditions.

Preferably, a colored phase change ink will be formed by combining the above described ink carrier composition with compatible colorant material, preferably subtractive primary colorants. The subtractive primary colored phase change inks comprise four component dyes, namely, cyan, magenta, yellow and black. U.S. Pat. Nos. 4,889,560 and 5,372,852 teach the preferred subtractive primary colorants employed. Typically these may comprise dyes from the classes of Color Index (C.I.) Solvent Dyes, C.I. Disperse Dyes, modified C.I. Acid and Direct Dyes, as well as a limited number of C.I. Basic Dyes. Also suitable as colorants are appropriate polymeric dyes, such as those described in U.S. Pat. No. 5,621,022 and available from Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, and uncut Reactant Violet X-80 or those described in U.S. Pat. No. 5,231,135.

Colored resin reaction products such as those described in U.S. Pat. No. 5,780,528 issued Jul. 14, 1998, and assigned to the assignee of the present invention, are also suitable colorants.

Polymeric colorants have also been being utilized in preparing commercial phase change ink jet inks, as well as potentially for use in other applications, such as gravure printing, and other types of inks and coating applications where coloration is desired. For example, the specific class of polymeric dyes characterized by: (1) an organic chromophore having (2) a polyoxyalkylene substituent and optionally (3) a carboxylic acid or non-reactive derivative thereof covalently bonded to the polyoxyalkylene substituent, have been described in U.S. Pat. No. 5,621,022 (Jaeger et al.).

Anthraquinone dyes and pigments have also been employed as a chromogen for many applications where colorants are required. Furthermore, it is known to make many derivatives of anthraquinones for specific colorant applications. Yet, anthraquinones and their derivatives have some short-comings when used in phase change inks. For example, solubility and blooming problems arise when known anthraquinone dyes are used in phase change inks. They are believed to be caused by the planar nature of the molecules of these colorants. Aggregation of dye moieties can take place more readily when the dye molecules are planar in nature. This aggregation leads to solubility problems at the operating temperatures inside the printer. Furthermore, any unaggregated dye molecules will work their way to the surface of the hardened phase change ink stick, resulting in blooming problems. Furthermore, the manufacturing processes for making commercially available anthraquinone derivative dyes have several disadvantages (e.g., solvents are typically used in making such derivatives, thus requiring solvent recovery, and such processes also involve elaborate purification procedures). The present invention seeks to retain the known advantages of anthraquinone chromogens (i.e., wide variety of purple to cyan shades, outstanding lightfastness and thermal stability) while overcoming the solubility and blooming problems of the conventional anthraquinone colorants as well as eliminating the above-noted manufacturing disadvantages of their preparation.

BRIEF SUMMARY OF THE INVENTION

Accordingly, one aspect of the present invention is directed to phase change ink compositions that comprise the combination of at least one phase change ink carrier component and a compatible phase change ink colorant that comprises the reaction product of at least one oxy-substituted-9,10-anthraquinone compound with at least one mono-functional amine compound.

It is a feature of the present invention that this class of anthraquinone dyes can be easily tailored by adjusting the molar ratio of the two reactants to provide a particular color shade from cyan to purple.

It is another feature of the present invention that this class of anthraquinone dyes are liquid at the elevated temperatures at which phase change ink printers operate, yet are solid at room temperatures.

It is another feature of the present invention that these anthraquinone dyes may be used as either the sole colorant material or can be used with other conventional phase change ink colorant materials in a phase change ink.

It is still another feature of the present invention that these anthraquinone dyes may be employed with conventional phase change carrier components (e.g., amide waxes, resinous components, tackifiers, toughening agents, hardeners, adhesion promoters and the like).

It is an advantage of the present invention that this class of anthraquinone dyes is easy to manufacture.

It is an advantage of the present invention that this class of anthraquinone dyes may be made without additional solvents or the need for elaborate purification processes. The amine reactant can act as an initial solvent for the reaction and as the dye reaction product is made, it also can act as a solvent (i.e., it is a liquid at the elevated temperatures that the reaction is run at). This greatly simplifies the manufacture of these dyes.

It is another advantage of the present invention that this class of anthraquinone dyes do not display the typical characteristics of planar molecules because they have sufficiently large substituents condensed thereonto which prevent the anthraquinone molecules from aggregating, as well as compatabilizing the molecules in the ink base and thus does not have the solubility and blooming problems associated with other anthraquinone dyes. Furthermore, this class of anthraquinone dyes retain the desired lightfastness and thermal stability properties for which anthraquinone dyes are known.

DESCRIPTION OF THE PREFERRED EMBODIMENTS

The term "oxy-substituted-9-10-anthraquinone compound" is used herein refers to any 9,10-anthraquinone compound or reduced form thereof having one or more additional carbonyl groups on one of the outer rings. One preferred class of these anthraquinone compounds are 1,4-oxy-substituted-9,10-anthraquinone compounds (i.e., carbonyl groups are on both of the 1- and 4-positions of one of the outer rings).

Examples of 1,4-oxy-substituted-9,10-anthraquinione compounds include leucoquinizarin and quinizarin. Leucoquinizarin is the reduced from of quinizarin and has the following chemical formula (I):

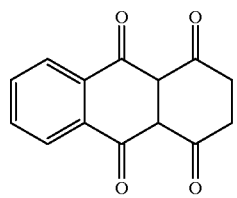

Quinizarin has the following chemical formula (II):

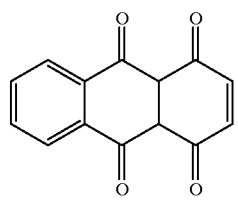

It is particularly preferred to use a mixture of quinizarin and leucoquinizarin. Because quinizarin is less expensive than leucoquinizarin and also is available in a highly purified "sublimed" form; the preferred molar ratio is in the range of about 1 to about 10 moles of quinizarin per mole of leuco quinizarin.

Suitable monofunctional amines include any monofunctional amine that is capable of reacting with the oxy-substituted-9,10-anthraquinone compound to make a suitable phase change colorant or colorants. The preferred monofunctional amines would include aliphatic monoamines, aromatic mono-amines, aliphatic/aromatic monoamines, fused ring system mono-amines, polyoxyalkylenemonoamines, and hydroxyl/amino-containing compounds.

Examples of aliphatic monoamines include any aliphatic primary or secondary amine (e.g. a$C_1$–$C_{22}$ or higher linear amine, any branched amine or any cyclic aliphatic amine) such as methyl amine, ethyl amine, (n- and iso)propyl amine, (n-, iso-, and t-) butylamine, (n-, iso-, t-, and the like)pentyl amine, (n-, iso- t-, and the like) hexyl amine, (n-, iso-, t-, and the like) octyl amine, (n-, iso-, t, and the like) nonyl amine, (n- and branched) decyl amine, (n- and branched) undecyl amines, (n- and branched) dodecyl amines, (n- and branched) hexadecyl amine, (n- and branched) dodecyl amines, dimethyl amine, diethyl amine, di(n- and iso-)propyl amines, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di)n-, iso-, t-, and the like)decyl amine, di(n-, iso-, t-, and the like)dodecyl amine, di)n-, iso-, t-, and the like)octadecyl amine, cyclohexyl amine, 2,3-dimethyl-1-cyclohexylamine, piperidine, pyrrolidine, and the like.

Examples of aromatic monoamines include aniline, anisidine, and the like.

Examples of aliphatic/aromatic amines include benzyl amine or analogues with longer or additional alkyl drains.

Examples of fused ring monoamines include rosin amine, dehydroabietyl amine, dihydroabietyl amine, hydroabietyl amine, and the like.

An example of hydroxyl/amino compounds includes ethanol amine.

An example of polyoxyalkylenemonoamines includes M-series Jeffamines available commercially from Huntsman Chemical Company of Austin, and the like. It should be noted that the condensation product of M-series Jeffamines and the oxy-substituted-9-10 anthraquinone compounds would likely be a viscous liquid at room temperature.

The most preferred class of monofunctional amines are aliphatic mono-amines. The most preferred aliphatic mono-amine is octadecyl amine.

If leucoquinizarin and octyldecylamine, or a quinizarin/ leucoquinizarin mixture and octyldecylamine are reacted together, that reaction products can be illustrated by the following chemical formulae (III) and (IV):

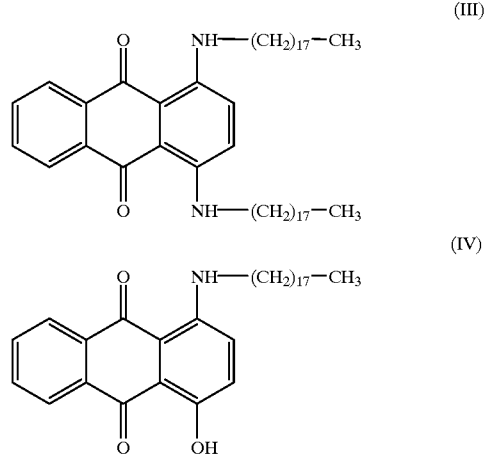

These reactions are condensation reaction where water is a by-product. Generally, these reactions are carried out at temperatures where the amine is in a liquid state so that it can act as the initial solvent for the reaction and where the reactive product is also a liquid so that it can act as the solvent as the reaction proceeds toward completion. Preferably, the reaction temperatures are from about 6° C. to about 125° C. Too high of reaction temperatures should be avoided to prevent degredation of the reaction product or the formulation of by-products.

This reaction can be carried out in conventional condensation reaction equipment. Preferably, the reaction is conducted under an inert atmosphere at a temperature where a molten reaction mixture is formed until the reaction is complete. The inert atmosphere is used to prevent premature oxidation of any leuco component in the reaction mixture.

The molar ratio of the amine reactant to anthraquinone reactant is preferably from about 1:1 to about 2:1. A molar ratio of about 2:1 favors the formation of a cyan colored dye (which is mainly a mono-amine substituted molar ratio of 1.5:1 favors a royal blue-colored dye (which is mixture of mono-amine and di-amine-substituted anthraquinone. A molar ratio of 1:1 favors the formation of a purple-colored dye (which is mainly a di-amine substitute anthraquinone.

The colorant compounds of the present invention may be combined with other conventional phase change ink colorants in making a phase change ink composition. For example, it may be desirable for certain applications to combine the present colorant or colorants with one or more polymeric dyes as described in U.S. Pat. No. 5,621,022 or conventional phase change ink colorants described in U.S. Pat. Nos. 4,889,560 and 5,372,852.

Furthermore, one or more anthraquinone colorants of the present invention (either with or without other colorants present) may be combined with conventional phase change carrier components including tetra-amide compounds, hydroxyl-functional tetra-amide compounds, mono-amides, hydroxyl-functional mono-amides, urethane and urea resins, mixed urethane/urea resins, tackfiers, plasticizers, antioxidants, viscosity reducing agents such as those disclosed in U.S. Pat. Nos. 4,889,560; 4,889,761; 5,372,852; 5,621,022; 5,700,851; 5,750,604; 5,780,528; 5,782,966,5, 783,658, 5,827,918 and 5,830,942. Suitable hardening agents may also be employed.

The preferred amounts of each colorant and carrier ingredient will depend upon the particular end-use application.

The following Examples and Comparisons are presented to illustrate the scope of the invention and to be illustrative of the formulations that can successfully be employed, without any intent to limit the invention to the specific materials, process or structure employed. All parts and percentages are by weight and all temperatures are degrees Celsius unless explicitly stated otherwise.

EXAMPLE 1

Cyan Dye Made from Leucoquinizarin, Quinizarin and Octyldecyl Amine

To a 1000 ml four-neck resin kettle equipped with a Trubore stirrer and thermocouple-temperature controller, $N_2$ atmosphere, and vacuum adapter was added about 25.0 grams (0.103 moles) of leucoquinizarin[1], about 75.0 grams (0.313 moles) of quinizarin[1], and about 223.7 grams (0.831 moles) of octadecyl amine[3] and stirred thoroughly. The mixture was carefully heated to 90° C. with $N_2$ atmosphere, at which time it became molten and agitation was begun. After 2.5 hours at 90° C. a $N_2$ addition was stopped, a vacuum was introduced to the reaction vessel and the temperature was increased to 100° C. After 30 minutes the vacuum was removed and $N_2$ re-introduced and the reaction was heated at 100° C. for 1 hour. A sample was taken and an absorbance ratio at 600 and 650 nms measured, in toluene, using a Perkin Elmer Lambda 2S UV/VIS spectrophotometer in toluene. The ratio was less than the desired 0.90 and little to no absorbance in the 450–500 nm range. The $N_2$ atmosphere was removed and air (containing $O_2$) was vigorously blown into the reaction vessel to insure complete oxidation. After 2 hours the spectral strength and absorbance ratio was measured on a sample indicating the reaction was complete. This final product was a blue solid wax at room temperature characterized by the following physical properties: viscosity of about 10.8 cPs as measured by a Ferranti-Shirley cone-plate viscometer at about 140° C., and a spectral strength of about 20,900 milliliters. Absorbance Unites per gram at lambda$_{mas}$ as measured using a Perkin Elmer Lambda 2S UV/VIS spectrophotometer in toluene. The final product is believed to be the compound having the chemical formula III shown above:

[1]Leucoquinizarin—available from Aldrich Chemicals of Milwaukee, Wis.
[2]Quinizarin—available from Aceto Corp. of Lake Success, N.Y.
[3]ARMEEN 18D FLK—octadecyl amine available from Akzo Nobel Chemicals Inc. of McCook, Ill.

EXAMPLE 2

Royal Blue Dye Made from Leucoquinizarin, Quinizarin and Octyldecyl Amine

To a 140 ml beaker equipped with teflon coated magnetic stir bar and placed in a silicone oil bath on a stirring hot plate was added about 12.1 grams (0.05 moles) of leucoquinizarin[1], about 12.0 grams (0.05 moles) of quinizarin[2], and about 40.4 grams (0.150 moles) octadecyl amine[3] and stirred thoroughly. The mixture was carefully heated to 70° C. with $N_2$ atmosphere, at which time it became molten and agitation was begun. After 2.0 hours at 70° C. the temperature was slowly increased to 115° C. over 1 hour and held from an additional hour. During this time samples were taken and diluted in toluene and measured in a UV/VIS spectrophotometer to monitor reaction completion. $N_2$ addition was stopped, and a $O_2$ atmosphere introduced to the reaction vessel and the temperature was increased to 140° C. After 2 hours at 140° C. the reaction was poured. A sample was taken and an absorbance ratio at 600 and 650 nms measured, in toluene, using a Perkin Elmer Lambda 2S UV/VIS spectrophotometer in toluene. The ratio was 0.927 and little to no absorbance in the 450–500 range. The spectral strength of about 18,020 milliliters. Absorbance Units per gram at lambda$_{mas}$ was measured using a Perkin Elmer Lambda 2S UV/VIS spectrophotometer in toluene. The final product is believed to be two compounds with the chemical formulae of III and IV above.

[1]Leucoquinizarin—available from Aldrich Chemicals of Milwaukee, Wis.
[2]Quinizarin—available from Aceto Corp. of Lake Success, N.Y.
[3]ARMEEN 18D FLK—octadecyl amine available from Akzo Nobel Chemicals Inc. of McCook, Ill.

EXAMPLE 3

Purple Dye Made from Leucoquinizarin, Quinizarin and Octyldecyl Amine

To a 500 ml four-neck resin kettle equipped with a Trubore stirrer and thermocouple-temperature controller, vacuum adaptor, and $N_2$ atmosphere was added about 30.0 grams (0.125 moles) of qunizarin[2] and about 49.2 grams (0.183 moles) octadecyl amine[3] and stirred thoroughly. The mixture was carefully heated to 80° C. with $N_2$ atmosphere, at which time it became molten and agitation was begun. At that time, about 12.2 grams (0.0504 moles) of leucoquinizarin[2] was added over 30 minutes and the temperature increased to 90° C. with a $N_2$ atmosphere maintained. After 40 minutes at 90° C. the temperature was increased to 100° C. After 1 hour at 100° C. the temperature was increased to 110° C. After about 7 hours at 110° C., the $N_2$ atmosphere was removed and an $O_2$ atmosphere introduced. The heating was continued for about 3 hours. A sample was taken and an absorbance ratio at 602 and 561 nms measured, in toluene, using a Perkin Elmer Lambda 2S UV/VIS spectrophotometer in toluene. The final product was a purple solid wax at room temperature characterized by the following physical properties: Spectal strength of about 19,162 milliliters. Absorbance Units per gram at lambda$_{max}$ as measured using a Perkin Elmer Lambda 2SUV/VIS spectrophotometer in toluene. The final product is believe to be the compound having the chemical formula IV above.

[3]Leucoquinizarin—available from Aldrich Chemicals of Milwaukee, Wis.
[2]Quinizarin—available from Aceto Corp. of Lake Success, N.Y.
[3]ARMEEN 18D FLK—octadecyl amine available from Akzo Nobel Chemicals Inc. of McCook, Ill.

EXAMPLE 4

Cyan Hybrid Ink Made from a Hybrid Ink Base and Cyan Colored Substituted Anthraquinone Dye In a stainless steel beaker were combined 345.6 grams of the molten reaction mixture from Example 5 from U.S. Ser. No. 09/023,366, filed Feb. 13, 1998, 123.5 grams of molten Polywax PE850[1] (250 grams), 8.3 grams of the cyan dye from Example 1 and 24.3 grams of the urethane/urea resin from Example 2 of U.S. Pat. No. 5,830,942, issued Nov. 3, 1998 as a viscosity adjustment. The materials were blended by stirring in a temperature controlled mantle for 2 hours at 125° C. The ink was then filtered through a heated (125° C.) Mott apparatus (available from Mott Mettalurgical) using a #3 Whatman filter paper at 15 psi. The filtered hybrid ink was poured into molds and allowed to solidify to form ink sticks. This final cyan ink product was characterized by following physical properties: viscosity of about 11.5 cPs at 140° C. as measured by a Ferranti-Shirley cone-plate viscometer, and two melting points at about 91° C. and about 105° C. as measured by differential scanning calorimetry using a DuPont 2100 calorimeter. The Tg of this ink was not measured. The spectral strength of the ink was determined using a spectophotographic procedure based on the measurement of the colorant in solution by dissolving the ink in butanol and measuring the absorbance using a Perkin Elmer Lambda 2S UV/VIS spectrophotometer. The spectral strength of the ink was measured as about 340 milliliters. Absorbance Units per gram at the lambda$_{max}$ of 647 nm. This ink was placed in a Phaser 350 printer which uses an offset transfer printing process. The ink was printed using a print head temperature of 140° C., a drum temperature of 60° C. and a paper preheat temperature of 60° C. The finished cyan prints were found to have the following CIELab color values:

| | L* | a* | b* |
|---|---|---|---|
| CYAN INK ON PAPER | 57.2 | −3.7 | −31.4 |

[1]Polywax PE850-Polyethylene wax available from Baker Petrolite Co. of Tulsa, Oklahoma.

EXAMPLE 5

Black Hybrid Ink Made from a Polycarbonate-modified Hybrid Ink Base, Blue Colored Substituted Anthraquinone Dye and Commercial Red and Orange Dyes In a stainless steel beaker were combined 135 grams of the polycarbonate-modified resin from Example 11 of U.S. patent application Ser. No. 09/023,851, 166.7 grams of Polywax PE850[1] and 141 grams of S-180 amide wax[2,]22.9 grams of the royal blue dye from Example 2, 1.03 grams of Solvent Red 195[3] dye and 2.28 grams of Disperse Orange 47[4] dye. The materials were melted by placing in a 135° C. oven overnight, then blended by stirring in a temperature controlled mantle for 2 hours at 125° C. The ink was then filtered through a heated (125° C.) Mott apparatus (available from Mott Mettalurgical) using a #3 Whatman filter paper at 15 psi. The filtered hybrid ink was poured into molds and allowed to solidify to form ink sticks. This final black ink product was characterized by the following physical properties: viscosity of about 12.9 cPs at 140° C. as measured by a Ferranti-Shirley cone-plate viscometer, and two melting points at about 91° C. and about 105° C. as measured by differential scanning calorimetry using a DuPont 2100 calorimeter. The Tg of this ink was not measured. The spectral strength of the ink was determined using a spectophotographic procedure based on the measurement of the colorant in solution by dissolving the ink in butanol and measuring the absorbance using a Perkin Elmer Lambda 2S UV/VIS spectrophotometer. The spectral strength of the ink measured as about 1100 milliliters. Absorbance Units per gram at the lambda$_{max}$ of 599 nm. This ink was placed in a Phaser 340 printer which uses an offset transfer printing process.

The ink was printed using a print head temperature of 140° C, a drum temperature of 60° C. and a paper preheat temperature of 60° C. The finished black prints were found to have the following CIELab color values.

|  | L* | a* | b* |
|---|---|---|---|
| BLACK INK ON PAPER | 20.4 | 0.4 | 0.2 |

[1]Polywax PE850-Polyethylene wax available from Baker Petrolite Co. of Tulsa, Oklahoma.
[2]Kemamide S-180-stearyl stearamide available from Witco Chemical Company of Memphis, Tennessee.
[3]Solvent Red 195-Solvaperm Red BB available from Clariant GmbH, Frankfurt, Germany.
[4]Disperse Orange 17-Macrolex Orange R available from Keystone Inc., Chicago, ILL.

EXAMPLE 6

Black Hybrid Ink Made from a Polycarbonate-modified Hybrid Ink Base, Blue Colored Substituted Anthraquinone Dye, Violet Colored Substituted Anthraquinone Dye and Commercial and Orange Dye In a stainless steel beaker were combined 135 grams of the polycarbonate-modified resin from Example 11 of U.S. patent application Ser. No. 09/023,851 filed Feb. 13, 1998, 117.3 grams of Polywax PE850[1] and 141 grams of S-180 amide wax, 16.7 grams of the blue dye from Example 2, 8.3 grams of the violet dye from Example 3, and 2.72 grams of disperse Orange 47[4] dye. The materials were melted by placing in a 135° C. oven overnight, then blended by stirring in a temperature controlled mantle for 2 hours at 125° C. The ink was then filtered through a heated (125° C.) Mott apparatus (available from Mott Mettalurgical) using a #3 Whatman filter paper at 15 psi. The filtered hybrid ink was poured into molds and allowed to solidify to form ink sticks. This final black ink product was characterized by the following physical properties: viscosity of about 12.2 cPs at 140° C. as measured by a Ferranti-Shirley cone-plate viscometer, and two melting points at about 91° C. and about 105° C. as measured by differential scanning calorimetry using a DuPont 2100 calorineter. The Tg of this ink was not measured. The spectral strength of the ink was determined using a spectophotographic produce based on the measurement of the colorant in solution by dissolving the ink in butanol and measuring the absorbance using a Perkin Elmer Lambda 2S UV/VIS spectrophotometer. The spectral strength of the ink was measured as about 1182 milliliters. Absorbance Unit per gram at the lambda$_{mas}$ of 599 nm. This ink was placed in a Phaser 340 printer which uses an offset transfer printing process. The ink was printed using a print head temperature of 140° C., a drum temperature of 60° C. and a paper preheat temperature of 60° C. The finished black prints were found to have the following CIELab color values:

|  | L* | A* | B* |
|---|---|---|---|
| BLACK INK ON PAPER | 21.4 | 1.7 | 1.8 |

[1]Polywax PE850-Polyethylene wax available from Baker Petrolite Co. of Tulsa, Oklahoma.
[2]Kemamide S-180-stearyl stearamide available from Witco Chemical Company of Memphis, Tennessee.
[3]Disperse Orange 47-Macrolex Orange R available from Keystone Inc., Chicago, ILL.

While the invention has been described above with reference to specific embodiments thereof, it is apparent that many changes, modifications, and variations can be made without departing from the inventive concept disclosed herein.

Accordingly, the spirit and broad scope of the appended claims is intended to embrace all such changes, modifications and variations that may occur to one of skill upon a reading of the disclosure. All patent applications, patents and other publications cited herein are incorporated by reference in their entirety.

What is claimed is:

1. A phase change ink composition comprising the combination of at least one phase change ink carrier component and a compatible phase change ink colorant that comprises the reaction product of at least one oxy-substituted-9,10-anthraquinone compound with at least one mono-functional amine compound.

2. The phase change link composition of claim 1 wherein the oxy-substituted-9,10 anthraquinone compound is a 1,4-oxy-substituted-9,10-anthraquinone.

3. The phase change ink composition of claim 2 wherein the 1,4-oxy-substituted-9,10-anthraquinone compound is a leucoquinizarin or mixture of quinizarin and leucoquinizarin.

4. The phase change ink composition of claim 1 wherein the mono-functional amine is selected from the group of one or more aliphatic monoamines, an aromatic monoamines, an aliphatic/aromatic monoamines, fused ring system monoamines, polyoxyalkylenemonoamines, and hydroxyl/amino-containing compounds.

5. The phase change ink composition of claim 4 wherein the mono-functional amine is at least one aliphatic monoamine.

6. The phase change ink composition of claim 5 wherein the aliphatic mono-amine is octyldecyl amine.

7. The phase change ink composition of claim 1 wherein the molar ratio of amine to anthraquinone compound is from about 1:1 to about 2:1.

* * * * *